United States Patent Office 3,184,439
Patented May 18, 1965

3,184,439
POLYESTERS OF EPOXIDIZED ALIPHATIC ACIDS AND CROSSLINKED PRODUCTS
Karl Brack, Wilmington, Del., assignor to Hercules Powder Company, Wilmington, Del., a corporation of Delaware
No Drawing. Filed Sept. 27, 1961, Ser. No. 141,020
13 Claims. (Cl. 260—78.4)

This invention relates to a new class of polymeric ester compounds, and more particularly, to a new class of linear polymeric ester compounds, and to cross-linked polymeric compositions derived therefrom. The invention has among its objects the provision of new compositions of matter, together with processes for their preparation. Other objects and advantages will be apparent from the description of the invention.

According to this invention, it has been discovered that epoxidized saturated aliphatic acids which contain an oxirane ring, that is, the atomic grouping:

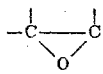

and which are compounds represented by the following general formula:

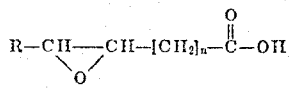

in which R is hydrogen or an alkyl radical and $n$ is any whole number from 0 to 20, inclusive, undergo polymerization when subjected to heat, with or without a basic catalyst, to produce linear polymeric ester compounds which may be represented by the general formula:

(1)
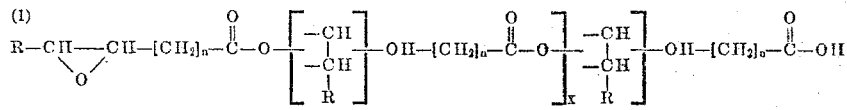

in which R is a substituent of the group consisting of hydrogen and alkyl radicals, $n$ is any whole number from 0 to 20, inclusive, and $x$ is at least 1.

Similarly, it has also been discovered in accordance with this invention that the alkali metal salts of halohydrated saturated aliphatic acids which contain the halohydrin grouping:

in which X represents a halogen substituent, and which are compounds represented by the following general formula:

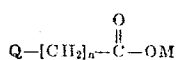

in which Q is a substituent of the group consisting of

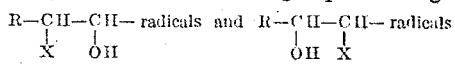

in which R is hydrogen or an alkyl radical, X is a halogen substituent, $n$ is any whole number from 0 to 20, inclusive, and M is an alkali metal substituent group, also undergo polymerization when subjected to heat to produce linear polymeric ester compounds which may be represented by the general formula:

(2)
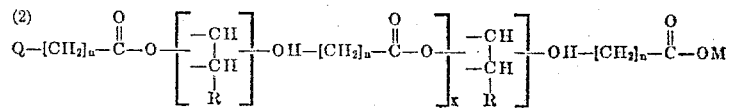

in which R is a substituent of the group consisting of hydrogen and alkyl radicals; $n$ is any whole number from 0 to 20, inclusive; $x$ is at least 1; M is an alkali metal substituent group; and Q is a substituent of the group consisting of

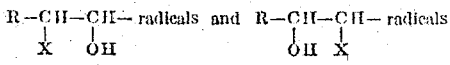

in which R has the same significance as set forth above and X is a halogen substituent group.

It will be seen from Formulas 1 and 2 above that the new polymeric compounds of this invention are linear polyester structures which, although differing in terminal or end group configuration, are identical otherwise and are characterized by having a plurality of hydroxyl substituent groups attached at regular intervals along the polymer chain. It is the polyfunctionality imparted by this plurality of hydroxyl groups which is of significance in accordance with this invention, and these new linear polyester compounds may have a diversity of terminal or end groupings without interfering with the polyfunctionality imparted by the plurality of hydroxyl substituent groups. By way of example, for many purposes it is desirable to obtain linear polyesters with a relatively low degree of polymerization, commonly termed "oligomers." The degree of polymerization to prepare such oligomers can be readily controlled by adding "chain terminators" to the polymerization mixture. When using epoxidized saturated fatty acids, which may also be termed epoxyalkanoic acids, for preparing the linear polyester compounds of this invention, the most desirable chain terminating agents for the purpose of preparing such oligomers are monofunctional epoxides such as ethylene oxide, propylene oxide, epihalohydrins such as epichlorohydrin, epibromohydrin, and the like. These monofunctional epoxides react with the terminal free carboxylic acid group of the polymer chains thus terminating growth of the polymer chains at the desired degree of polymerization by forming either hydroxyalkyl or halohydroxyalkyl esters, depending on whether an alkylene oxide or an epihalohydrin is employed as the chain terminator. If desired, aliphatic acids such as formic acid, acetic acid, butyric acid, oleic acid, stearic acid, and the like, as well as hydroxy aliphatic acids and dihydroxy aliphatic acids, may also be employed as chain terminators to control the degree of polymerization. Nonepoxidized acid impurities present in crude epoxidized alkanoic acids, such as free oleic and stearic acids, as well as 9,10-dihydroxystearic acid, derived from vegetable or animal fatty acids or tall oil distillation cuts can also function as chain terminators. These aliphatic acids, hydroxy aliphatic acids, and dihydroxy aliphatic acids, terminate polymer chain growth by reacting with the epoxide end groups of the oligomer. Similarly, when the alkali metal salts of halo hydrated saturated aliphatic acids are employed to prepare the linear polyester compounds of this invention, suitable chain terminating agents are the alkali metal salts of aliphatic acids, hydroxy aliphatic acids and dihydroxy aliphatic acids. The alkali metal salts of these acids terminate polymer chain growth by reacting with the halogen in the halohydrin end groups of the oligomer.

In its broadest scope, therefore, this invention also contemplates linear polymeric ester compounds of the type depicted by Formula 1 above which have been reacted with either monofunctional epoxide chain terminating agents or with aliphatic acid chain terminating agents, or with hydroxy or dihydroxy aliphatic acids, or with any combination of these types of chain terminating agents, as well as linear polymeric ester compounds of the type depicted by Formula 2 above which have been reacted with alkali metal salts of aliphatic acids, hydroxy aliphatic acids or dihydroxy aliphatic acids.

In its broadest scope, therefore, this invention contemplates any and all linear polymeric ester compounds represented by the following general formula:

(3)
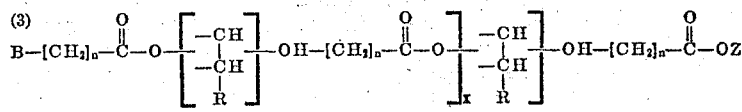

in which R is a substituent of the group consisting of hydrogen and alkyl radicals; n is a whole number from 0 to 20, inclusive, x is at least 1; B is a substituent of the group consisting of

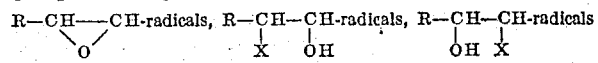

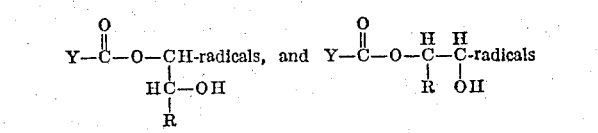

in which R has the same significance as set forth above, and Z is a substituent of the group consisting of hydrogen, group consisting of hydrogen, straight and branched chain aliphatic hydrocarbon radicals,

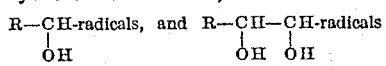

in which R has the same significance as set forth above; and Z is a substituent of the group consisting of hydrogen, hydroxyalkyl radicals, halohydroxylalkyl radicals, and alkali metal radicals. The linear polymeric ester compounds of this invention have a degree of polymerization of at least 3. Moreover, this invention contemplates linear polymeric ester structures in which the hydroxyl radicals of the several repeating units may be attached to carbon atoms in the main linear chain of the polyester structure, linear polymeric ester structures in which the hydroxyl radicals in the several repeating units may be attached to carbons in side chains of the repeating units, and linear polymeric ester structures in which some hydroxyl radicals are attached to carbon atoms in the main linear chain of the polyester and other hydroxyl radicals are attached to carbons in side chains of the repeating units, as well as mixtures thereof. These embodiments are illustrated by formulas 4, 5, 6, 7 and 8 as follows:

(4)
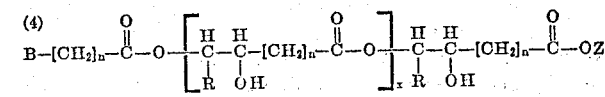

in which B, n, R, x and Z have the same significance as set forth for Formula 3 above;

(5)
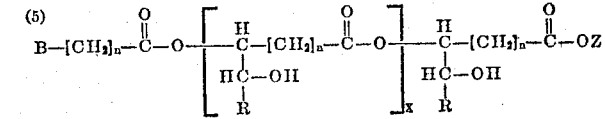

in which B, n, R, x and Z have the same significance as set forth for Formula 3 above; and (6)
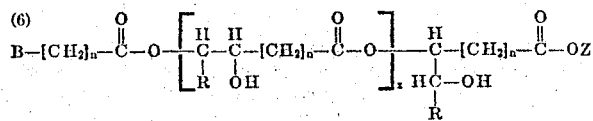

in which B, n, R, x and Z have the same significance as set forth for Formula 3 above.

(7)
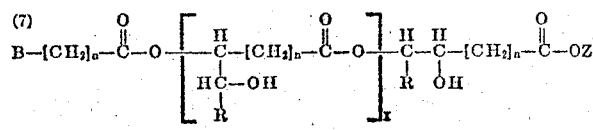

in which B, n, R, x and Z have the same significance as set forth for Formula 3 above.

(8)
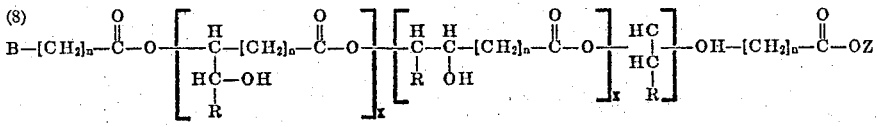

in which B, n, R, x and Z have the same significance as set forth for Formula 3 above.

This invention also contemplates linear polymeric ester structures derived by reacting together molecules of a single epoxidized saturated aliphatic acid, or of an alkali metal salt of a single halohydrated saturated aliphatic acid, as well as linear polymeric ester structures derived by reacting together molecules of two or more different epoxidized saturated aliphatic acids, or of alkali metal salts of two or more different halohydrated saturated aliphatic acids.

Any epoxidized saturated aliphatic acid having the general formula:

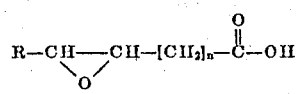

in which R is hydrogen or an alkyl radical and in which n is any whole number from 0 to 20, inclusive, is operative for the purposes of this invention. Similarly, any alkali metal salt of any halohydrated saturated aliphatic acid having the general formula:

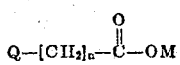

in which Q is a substituent of the group consisting of

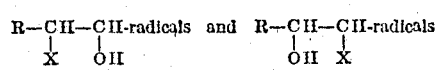

in which R is hydrogen or an alkyl radical, X is a halogen substituent group, n is any whole number from 0 to 20, inclusive, and M is an alkali metal substituent group is likewise operative for the purposes of this invention. When R represents an alkyl radical, R may be either a straight chain or a branched chain alkyl radical, such as for example, methyl, ethyl, n-propyl, isopropyl, n-butyl, isobutyl, tertiary butyl, straight and branched chain pentyl radicals, straight and branched chain hexyl radicals, straight and branch chain heptyl radicals, straight and branched chain octyl radicals, straight and branched chain decyl radicals, straight and branched chain dodecyl radicals, straight and branched chain octadecyl radicals, straight and branched chain decadecyl radicals, and the like.

The simplest epoxidized aliphatic acid coming within the scope of this invention is epoxypropionic acid,

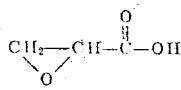

Other typical epoxidized saturated aliphatic acids include by way of example, 2,3-epoxybutyric acid; 3,4-epoxybutyric acid; 2,3-epoxyhexanoic acid; 3,4-epoxyhexanoic acid; 5,6-epoxyhexanoic acid; 2,3-epoxyoctanoic acid; 5,6-epoxyoctanoic acid; 7,8-epoxyoctanoic acid; 2,3-epoxyundecanoic acid; 5,6-epoxyundecanoic acid; 10,11-epoxyundecanoic acid; 2,3-epoxyhexadecanoic acid; 7,8-epoxyhexadecanoic acid; 15,16-epoxyhexadecanoic acid; 2,3-epoxyoctadecanoic acid; 9,10-epoxyoctadecanoic acid; 10,11-epoxyoctadecanoic acid; 11,12-epoxyoctadecanoic acid; 12,13-epoxyoctadecanoic acid; 17,18-epoxyoctadecanoic acid, and the like.

Typical halohydrated saturated aliphatic acids include by way of example,

2(3)-chloro-3(2)-hydroxybutyric acid;
3(4)-bromo-4(3)-hydroxybutyric acid;
2(3)-iodo-3(2)-hydroxyhexanoic acid;
3(4)-chloro-4(3)-hydroxyhexanoic acid;
5(6)-chloro-6(5)-hydroxyoctanoic acid;
7(8)-bromo-8(7)-hydroxyoctanoic acid;
2(3)-chloro-3(2)-hydroxyhexadecanoic acid;
7(8)-iodo-8(7)-hydroxyhexadecanoic acid;
15(16)-chloro-16(15)-hydroxyhexadecanoic acid;
2(3)-chloro-3(2)-hydroxyoctadecanoic acid;
9(10)-chloro-10(9)-hydroxyoctadecanoic acid;
10(11)-chloro-11(10)-hydroxyoctadecanoic acid;
11(12)-chloro-12(11)hydroxyoctadecanoic acid;
12(13)-chloro-13(12)-hydroxyoctadecanoic acid;
17(18)-bromo-18(17)-hydroxyoctadecanoic acid;
and the like.

The epoxidized saturated fatty acids of this invention, which may also be termed epoxyalkanoic acids, may be readily prepared from the corresponding alkenoic acids by well known and conventional methods for introducing an epoxy group into a molecular structure having an ethylenic unsaturated substituent group therein. For example, the unsaturated fatty acid may be epoxidized by treating it with a solution of peracetic acid in acetic acid solution in accordance with the method disclosed in U.S. Patent 2,458,484, as follows:

Glacial acetic acid or acetic acid of high concentration is reacted with aqueous hydrogen peroxide solution containing 30–90% by weight of hydrogen peroxide with 1.5% by weight of a sulfuric acid catalyst until equilibrium is attained, approximately 2 hours at 40° C. to 12 hours at 25° C. After the reaction is complete, sodium hydroxide or other base is added in an amount equivalent to, or slightly in excess of, that required to neutralize the sulfuric acid catalyst. To the resulting solution of peracetic acid there is then added the unsaturated fatty acid and the mixture is stirred so that a fine emulsion is formed. This reaction is slightly exothermic and the temperature is regulated within reasonable limits, from room temperature to 45° C. or higher, and maintained at this temperature for a suitable time, such as 4 hours at 25° C., 2 hours at 35° C., or 1 hour at 45° C. At the end of the reaction time more water may be added in sufficient amount to aid in the separation of the epoxidized product which separates as an oil or solid, and is recovered by usual methods, washed with water, and dried.

Epoxy acids can also be readily prepared by the well known chlorohydrin method. Thus, any desired epoxyalkanoic acid may be readily prepared from the corresponding alkenoic acid. For example, epoxypropionic acid may be prepared from propenoic acid; 2,3-epoxybutyric acid may be prepared from 2-butenoic acid; 10,11-epoxyundecanoic acid may be prepared from 10-undecenoic acid; and 9,10-epoxystearic acid may be prepared from oleic acid, etc. However, it is not necessary for the purposes of this invention that a purified unsaturated acid be employed to prepare the epoxyalkanoic acids used in this invention. For example, it has been found that 9,10-epoxystearic acid suitable for the purposes of this invention may be prepared from crude oleic acid derived from various vegetable and animal fats, or from tall oil distillation cuts, and containing stearic acid and other fatty acids as impurities. If low DP oligomers are desired, it may be preferable to use crude, partly epoxidized oleic acid, that is, a crude oleic acid epoxidized to a calculated degree, and containing epoxidized oleic acid, oleic acid, stearic acid, and epoxidation by-products such as 9,10-dihydroxystearic acid, etc., as a starting material. All the nonepoxidized acids then will serve as chain terminators.

Halohydrated saturated aliphatic acids, employed in the form of the alkali metal salts thereof to produce linear polyester compounds in accordance with this invention, may be readily prepared from the corresponding alkenoic acids by well known and conventional methods for introducing a halohydrin group into a molecular structure having an ethylenic unsaturated substituent group therein. For example, the unsaturated fatty acid may be reacted with a hypo halous acid such as hypochlorous acid, hypobromous acid, or hypoiodous acid to introduce the halohydrin grouping at the double bond. In this way any desired halohydrated alkanoic acid can be readily prepared from the corresponding alkenoic acid. For example, 2(3)-halo-3(2)-hydroxybutyric acid may be prepared by reacting 2-butenoic acid with hypochlorous acid; 3(4)-bromo-4(3)-hydroxybutyric acid may be prepared by reacting 3-butenoic acid with hypobromous acid; 7(8)-iodo-8(7)-hydroxyhexadecanoic acid may be prepared by reacting 7-hexadenoic acid with hypoiodous acid; 9(10)-chloro-10(9)-hydroxystearic acid may be prepared by reacting oleic acid with hypochlorous acid; etc.

The alkali metal salts of these halohydrated saturated aliphatic acids are readily prepared simply by neutralizing the free carboxylic acid groups of the halohydrated saturated aliphatic acids with a suitable alkali metal base, such as the oxide, hydroxide, or carbonate of lithium, sodium, potassium, rubidium or caesium.

As stated previously hereinabove, linear polymeric ester compounds in accordance with this invention are prepared by heating epoxyalkanoic acids, with or without a basic catalyst. The polymerization involves the reaction of epoxy substituent groups with carboxylic acid substituent groups of adjacent molecules to build up the linear polymeric ester structure, and proceeds slowly without a catalyst at elevated temperatures. In general, acids with internal epoxy groups react somewhat slower than acids having terminal epoxy groups. For example, 10,11-epoxyundecanoic acids starts polymerizing without a catalyst in solution at temperatures slightly above room temperature whereas 9,10-epoxystearic acid requires temperatures in excess of 100° C. to start polymerizing. Preferably, however, the polymerization is conducted in the presence of a basic catalyst, and at temperatures between about 75° C. and about 200° C. Suitable basic catalysts include by way of example, alkali metal oxides and hydroxides, alkali metal alcoholates, alkali metal salts of the epoxyalkanoic acid or acids being polymerized, as well as Lewis bases, such as triethylenediamine. These catalysts can be used in concentrations from about 0.01% to about 5% by weight, the preferred range being from about 0.1% to about 0.5% by weight, based on the weight of epoxyalkanoic acid.

A catalyst is neither necessary nor required when alkali metal salts of halohydrated saturated aliphatic acids are employed to prepare linear polyester compounds in accordance with this invention, heat alone being sufficient to effect polymerization at temperatures between about 75°

C. and about 200° C., preferably between about 120° C. and about 200° C.

The polymerization reaction is carried out until the desired degree of polymerization is attained, and the course of the polymerization is readily followed by taking samples at intervals and analyzing for acid number and saponification number when epoxyalkanoic acid is being polymerized. Since each polymer chain contains one carboxylic acid end group, the degree of polymerization (DP) equals $$\frac{\text{Saponification No.}}{\text{Acid No.}}$$

This formula is correct when pure epoxy acids, as well as impure epoxy acids which do not contain any ester type by-products, are used as starting material. However, when crude epoxy acids containing ester type by-products, such as epoxidized oleic acid containing some 9(10)-hydroxy-10(9)-acetoxystearic acid, are polymerized, the DP is calculated more accurately as follows:

$$DP = \frac{\text{Acid No. of crude epoxy acid}}{\text{Acid No. of oligomer}}$$

If desired, the degree of polymerization may also be calculated by analyzing samples taken at periodic intervals for oxirane oxygen content. Since each polymer chain contains one epoxy group, the degree of polymerization (DP) may be obtained from the following equation:

$$DP = \frac{A}{X + (A - B)}$$

in which A equals the theoretical oxirane oxygen content in percent by weight of the epoxyalkanoic acid being polymerized; B equals the actual or determined oxirane oxygen content in percent by weight of the epoxyalkanoic acid being polymerized; and X equals the determined value for oxirane oxygen content in percent by weight of the polymer produced.

When the alkali metal salt of a halohydrated saturated aliphatic acid is employed for preparing linear polymeric ester in accordance with this invention, the degree of polymerization may be followed during polymerization by obtaining the ester number of the polymer at intervals as the polymerization proceeds. The degree of polymerization may then be calculated by dividing the theoretical acid number of the halohydrated acid of the starting alkali metal salt thereof by the difference between the theoretical acid number of said halohydrated acid and the ester number of the polymer produced in the polymerization, as follows:

DP of Polymer =

$$\frac{\text{Theoret. Acid No. of halohydrated acid}}{(\text{Theoret. Acid No. of halohydrated acid}) - (\text{Ester No. of Polymer})}$$

The simplest means for controlling the DP of the linear polymeric esters of this invention is by just stopping the polymerization, that is, discontinue heating, when analysis of the reaction mixture indicates that the desired DP has been reached.

However, as pointed out hereinbefore, polymerization may also be controlled by adding "chain terminators" to the polymerization mixture, and various types of suitable chain terminating agents have been disclosed hereinabove for this purpose, including monofunctional epoxides such as alkylene oxides and epihalohydrins, aliphatic acids, hydroxy aliphatic acids, dihydroxy aliphatic acids when employing epoxyalkanoic acids for polymer preparation, and the alkali metal salts of aliphatic acids, hydroxy aliphatic acids, and dihydroxy aliphatic acids when employing halohydrated alkanoic acids for polymer preparation. Substantially all members of each of the above generic classes of chain terminating agents are operative for the purposes of this invention, and some typical alkylene oxides, epihalohydrins, and aliphatic acids have been disclosed hereinbefore. The advantages of using a partly epoxidized crude oleic acid, containing free oleic and stearic acids and epoxidation by-products, as a starting material for preparing low DP oligomers, in which the nonepoxidized acids act as chain terminators has also been pointed out hereinbefore. Some typical hydroxy aliphatic acids include hydroxyacetic acid; 2-hydroxypropionic acid; 2-hydroxy-3-methyl-butanoic acid; 10-hydroxy-undecanoic acid; 9-hydroxyoctadecanoic acid; and the like. Some typical dihydroxy aliphattic acids include 2,3-dihydroxy-butyric acid; 3-4-dihydroxyhexanoic acid; 5,6-dihydroxyoctanoic acid; 7,8-dihydroxyhexadecanoic acid; 9,10-dihydroxyoctadecanoic acid; and the like.

Since the linear polymeric ester compounds of this invention have a plurality of hydroxyl groups in the polymeric structure, these compounds have been found to be particularly useful as polyfunctional cross-linking agents for production of insoluble, infusible highly cross-linked polymers when cross-linked with other well known and conventional polyfunctional cross-linking agents. Films, foams, elastomers and plastics of various desired degrees of hardness, flexibility, etc. can be prepared in accordance with known and conventional methods of preparation, depending upon the epoxyalkanoic acid or halohydrated alkanoic acid employed for the polymerization, the degree of polymerization of the linear polymeric ester produced in the polymerization, and the type of the other poly-functional cross-linking agent employed.

Suitable polyfunctional cross-linking agents which are capable of reacting with the linear polymeric ester compounds of this invention to produce insoluble, infusible highly cross-linked polymers include by way of example, any di- or poly-isocyanate such as toluene diisocyanate, 4,4′-diphenyl-methane diisocyanate, and the like; any internal anhydride such as pyromellitic anhydride, maleic anhydride, chlorendic anhydride, succinic anhydride, tetrahydrophthalic anhydride, phthalic anhydride, hexahydrophthalic anhydride, nadic anhydride, and the like; any di- or poly-carboxylic acid such as oxalic acid, maleic acid, adipic acid, citric acid, citraconic acid, terephthalic acid, isophthalic acid, chlorendic acid, sebacic acid, azelaic acid, mellitic acid, pyromellitic acid, fumaric acid, itaconic acid, and the like; any bis-epoxide such as dicyclopentadiene diepoxide, vinyl cyclohexene dioxide, dipentene dioxide, resorcinol diglycidyl ether, bisphenol A digylcidyl ether, bis(3,4-epoxy-6-methyl-cyclohexyl methyl) adipate, and the like; any melamine-formaldehyde reaction product; any urea-formaldehyde reaction product; and the like.

An especially attractive use of the linear polymeric ester compounds of this invention is in the production of urethane foams. By way of example, such foams may be obtained by reacting a linear polymeric ester of 9,10-epoxystearic acid, or preferably a linear polymeric ester of 9,10-epoxystearic acid terminated with a monofunctional epoxide such as propylene oxide or epichlorohydrin, with toluene diisocyanate, 4,4′-diphenylmethane diisocyanate, or other polyisocyanates in presence of water, a catalyst such as triethylenediamine, and a silicone oil surfactant, or by reacting with di- or poly-isocyanates in the presence of Freon blowing agents.

It will be understood that various conventional additives such as inert fillers, dyes, pigments, plasticizers, stabilizing agents, tackifiers, and the like, may be added to the insoluble, infusible highly cross-linked polymers of this invention to impart desired characteristics thereto.

The general nature of the invention having been set forth hereinabove, the following examples illustrate some specific embodiments of the invention. It is to be understood, however, that the invention is in no way limited to the examples, since this invention may be practiced by the use of various modifications and changes within the scope of the invention as herein described.

Example 1

A mixture of 100 parts by weight of 9,10-epoxystearic acid of 98% purity and 6 parts by weight of sodium 9,10-epoxystearate was heated in a polymerization vessel in a nitrogen atmosphere at 150° C., and samples were taken at periodic time intervals and analyzed for acid number, ester number, saponification number and oxirane oxygen content. The following table presents data obtained after various time intervals as the polymerization progressed, together with degree of polymerization based on acid number, and also based on oxirane oxygen content of the polymer.

| Time in minutes | Acid number | Ester number | Saponification number | Oxirane oxygen content, percent by weight | Degree of polymerization Based on acid number | Degree of polymerization Based on oxirane oxygen content |
|---|---|---|---|---|---|---|
| 0 | 188 | 0 | 188 | 5.25 | 1.0 | 1.0 |
| 5 | 107 | 77 | 184 | 3.15 | 1.7 | 1.65 |
| 10 | 92 | 101 | 193 |  | 1.9 |  |
| 15 | 76 | 116 | 192 | 1.89 | 2.5 | 2.68 |
| 20 | 68 | 119 | 187 |  | 2.7 |  |
| 25 | 61 | 124 | 185 |  | 3.0 |  |
| 35 | 55 | 138 | 193 | 1.24 | 3.5 | 3.98 |
| 45 | 49 | 137 | 186 |  | 3.8 |  |
| 55 | 43 | 145 | 188 |  | 4.3 |  |
| 65 | 43 | 143 | 186 | 0.88 | 4.3 | 5.4 |
| 75 | 38 | 145 | 183 |  | 4.8 |  |
| 85 | 37 | 144 | 181 |  | 4.9 |  |
| 95 | 35 | 149 | 184 | 0.72 | 5.3 | 6.4 |

The final product was a clear oily resin, having a Reduced Specific Viscosity of 0.088 based on a 1.0% solution in tetrahydrofuran at 25° C., which was soluble in methyl isobutyl ketone and tetrahydrofuran.

Example 2

A mixture of 6 parts by weight of 9,10-epoxystearic acid of 91.6% purity and 0.105 part by weight of sodium methylate was heated for 3 hours in a polymerization vessel in a nitrogen atmosphere at 150° C. The product was a resin which analyzed as follows: acid number 26, corrected for the sodium present, saponification number 189, oxirane oxygen content 0.26% by weight. Based on these figures a degree of polymerization of 7.2, based on acid number, and a degree of polymerization of 7.5, based on oxirane oxygen, was calculated.

Example 3

Twenty (20) parts by weight of 9,10-epoxystearic acid was heated to 180–185° C. for 3 hours. A tough tacky rubber was obtained as a product having an acid number of 15.8, a saponification number of 189, and an oxirane oxygen content of 0.52%. The degree of polymerization based on acid number was 11.9, and the degree of polymerization based on oxirane oxygen content was 10.3.

Example 4

A mixture of 29.8 parts by weight of 9,10-epoxystearic acid of 96% purity and 0.14 part by weight of sodium methoxide was heated to 185° C. for 3 hours. The product, a clear tacky rubber, was dissolved in 143 parts by weight diethyl ether to form a cloudy solution which became clear upon washing once with ice cold aqueous sulfuric acid containing 5% sulfuric acid and twice with distilled water. A clear tough resin having an acid number of 17, a saponification number of 189, and a degree of polymerization based on acid number of 11 was obtained upon stripping off the diethyl ether.

Example 5

A mixture of 1 part by weight of 10,11-epoxyundecanoic acid and 0.0095 part by weight of sodium methoxide was heated in a polymerization vessel in a nitrogen atmosphere at 120° C. for 4.5 hours. A white, tough wax which was soluble in hot methyl isobutyl ketone was obtained. The product showed an acid number of 40.4, corrected for sodium present, and a saponification number of 280, thus indicating a degree of polymerization of 7.

Example 6

A mixture of 1.4 parts by weight of 10,11-epoxyundecanoic acid of 98% purity, 0.0065 part by weight of sodium methoxide and 2.5 parts by weight of xylene was heated to 110° C. for 17 hours, whereupon the xylene was stripped off. A white resin, soluble in methyl isobutyl ketone, was obtained having an acid number of 93.4, corrected for sodium present, a saponification number of 280 and a degree of polymerization of 3, based on acid number.

Example 7

A mixture of 3 parts by weight of 2,4-epoxybutyric acid and 0.03 part by weight of triethylenediamine was heated to 75° C. for 64 hours. A clear hard resin having an acid number of 107, a saponification number of 550, an oxirane oxygen content of 3.2% by weight, and which is soluble in tetrahydrofuran was obtained. The degree of polymerization based on acid number was 5.1, and the degree of polymerization based on oxirane oxygen was 5.

Example 8

A mixture of 3 parts by weight of 2,3-epoxybutyric acid and 0.03 part by weight of triethylenediamine was heated to 79° C. for 74 hours. A clear, hard, glass-like resin, soluble in methanol and also soluble in water, was obtained having an acid number of 72.8, a saponification number of 550 and a degree of polymerization of 7.5, based on acid number.

Example 9

This example illustrates preparation of a "terminated" linear polymeric ester of an epoxyalkanoic acid.

A mixture of 575 parts by weight of 9,10-epoxystearic acid of 78% purity and 1.75 parts by weight of triethylenediamine was heated in a closed polymerization vessel in a nitrogen atmosphere at 180° C. for 1 hour. During this time the acid number of the reaction mixture dropped to 54.5 thus corresponding to a degree of polymerization of 3.6. Then 63.5 parts by weight of epichlorohydrin was injected into the reaction mixture, which was then kept at 150° C. for another hour. The excess epichlorohydrin was removed by stripping. The resulting product was a light tan oil having an acid number of 2.1, a hydroxyl number of 189.3, and an ester number of 236.4.

Example 10

This example also illustrates preparation of a "terminated" linear polymeric ester of an epoxyalkanoic acid.

A mixture of 3,240 parts by weight of 9,10-epoxystearic acid of 71% purity and 10 parts by weight of triethylenediamine was heated in a closed polymerization vessel in a nitrogen atmosphere at 180° C. for 1 hour. The product was a light tan oil having an acid number of 47.4, an ester number of 149, and a hydroxyl number of 138.8, thus corresponding to a degree of polymerization of 4.

One thousand (1,000) parts by weight of the above polymeric ester compound were placed in an autoclave and heated to 110° C. for 2 hours, whereupon 75 parts by weight of propylene oxide were introduced at such a rate that the pressure did not rise above 100 pounds per square inch. Then the excess propylene oxide was stripped under reduced pressure. The product, a light tan oil, had an acid number of 0.4, an ester number of 171.1, a hydroxyl number of 174.7, and an oxirane oxygen content of 0.34% by weight.

The following examples illustrate preparation of insoluble, highly cross-linked polymeric compositions by reacting linear polymeric ester compounds of this invention with various cross-linking agents.

Example 11

Twenty-eight (28) milligrams of toluene diisocyanate were added to 1.57 milliliters of a 10% by weight solution of poly(9,10-epoxystearic acid) in tetrahydrofuran. The mixture was shaken until homogeneous, then poured onto a glass plate, and the solvent was allowed to evaporate. The film thus produced was cured for 18 hours at 150° C. A tough, hard and clear film which was insoluble in methyl isobutyl ketone was obtained.

Example 12

Three (3) grams of propylene oxide terminated poly-(9,10-epoxystearic acid) having a DP of 4 was dissolved in 10 milliliters of tetrahydrofuran. Then 7 milliliters of a 10% by weight solution of toluene diisocyanate in tetrahydrofuran was added. The mixture was shaken well, then poured onto a glass plate. The solvent was allowed to evaporate at room temperature, whereupon the resulting film was cured at 70° C. for 2 hours. A clear, hard, insoluble film was obtained.

Example 13

Two (2) milliliters of a 30% by weight solution of poly(2,3-epoxybutyric acid) having a DP of about 5 in methyl isobutyl ketone were mixed with 4 milliliters of a 10% by weight solution of toluene diisocyanate in tetrahydrofuran and poured onto a glass plate. The solvents were allowed to evaporate, and the film was then cured at 75° C. for 3 hours. A clear, hard, insoluble film was obtained.

Example 14

Six (6) milligrams of melamine, 12 milligrams of 37% formaldehyde, and 1.5 milliliters of a 10% by weight solution of poly(9,10-epoxystearic acid) in tetrahydrofuran were mixed together. The solution was then poured onto a glass plate and cured at 150° C. for 18 hours. A soft, insoluble film was obtained.

Example 15

One hundred fifty (150) milligrams of poly(9,10-epoxystearic acid) and 10 milligrams of terephthalic acid were dissolved in 5 milliliters of tetrahydrofuran, and the solution was poured onto a glass plate. Upon evaporation of the solvent, the resulting film was cured by baking for 18 hours at 150° C. A soft, white, insoluble film was obtained.

Example 16

Twenty-four and six-tenths (24.6) parts by weight of potassium 9(10)-chloro-10(9)-hydroxystearic acid were heated to 160° C. for 3 hours. The crude product was dissolved in about 214 parts by weight of diethyl ether, was washed with ice cold aqueous hydrochloric acid containing 5% by weight of HCl, and then with distilled water until neutral. After drying and stripping, 16.1 parts by weight of an off-white oil were obtained having an acid number of 23.0, an ester number of 171.1, and an active H (as hydroxyl) of 5.19%.

Ninety-nine hundreds (0.99) part of the above polymer was cross-linked with 0.52 part by weight of toluene diisocyanate. After curing at 75° C. for 2 hours a clear, hard, and insoluble film was obtained.

What I claim and desire to protect by Letters Patent is:

1. A linear polymeric ester compound having the general formula:

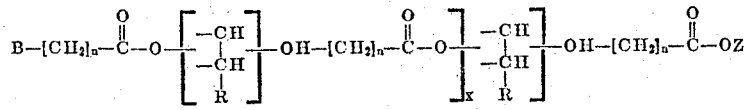

in which R is a substituent of the group consisting of hydrogen and alkyl radicals; $n$ is a whole number from 0 to 20, inclusive; $x$ is at least 1; Z is a substituent of the group consisting of hydrogen, hydroxyalkyl radicals, halohydroxyalkyl radicals, and alkali metal radicals; and B is a substituent of the group consisting of

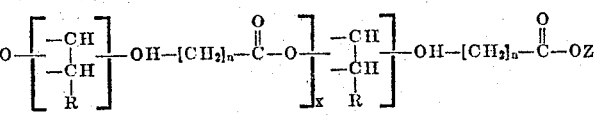

in which R has the same significance as set forth above, and X is a halogen substituent.

2. A linear polymeric ester compound of an epoxy-alkanoic acid, said compound having the general formula:

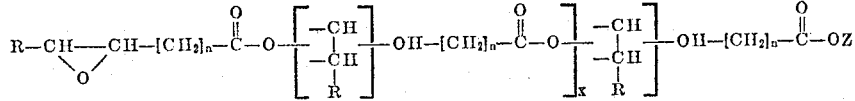

in which R is a substituent of the group consisting of hydrogen and alkyl radicals; $n$ is any whole number from 0 to 20, inclusive; $x$ is at least 1; and Z is a substituent of the group consisting of hydrogen, hydroxyalkyl radicals, halohydroxyalkyl radicals, and alkali metal radicals.

3. A linear polymeric ester compound of an alkali metal salt of a halohydrated alkanoic acid, said compound having the general formula:

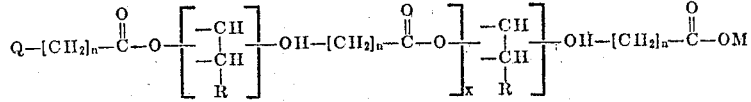

in which R is a substituent of the group consisting of hydrogen and alkyl radicals; $n$ is any whole number from 0 to 20, inclusive; $x$ is at least 1; M is an alkali metal substituent; and Q is a substituent of the group consisting of

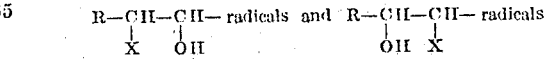

in which R has the same significance as set forth above and X is a halogen substituent.

4. A linear polymeric ester compound of 9,10-epoxystearic acid, said compound having the general formula as set forth in claim 1.

5. A linear polymeric ester compound of 2,3-epoxybutyric acid, said compound having the general formula as set forth in claim 1.

6. A linear polymeric ester compound of 10,11-epoxyundecanoic acid, said compound having the general formula as set forth in claim 1.

7. A linear polymeric ester compound of 9,10-epoxystearic acid, said compound having a terminal hydroxyalkyl ester substituent group and having the general formula as set forth in claim 1.

8. A linear polymeric ester compound of 9,10-epoxystearic acid, said compound having a terminal halohydroxyalkyl ester substituent group and having the general formula as set forth in claim 1.

9. A linear polymeric ester compound of 9(10)-chloro-10(9)-hydroxystearic acid, said compound having the general formula as set forth in claim 1.

10. An insoluble, infusible, highly cross-linked polymeric composition comprising the reaction product of a linear polymeric ester compound of an epoxyalkanoic acid having the general formula as set forth in claim 1 with a polyfunctional cross-linking agent selected from the group consisting of polycarboxylic acids and anhydrides.

11. An insoluble, infusible, highly cross-linked polymeric composition in accordance with claim 10 in which the cross-linking agent is terephthalic acid.

12. An insoluble, infusible, highly cross-linked polymeric composition comprising the reaction product of a linear polymeric ester compound of an alkali metal salt of a halohydrated alkanoic acid having the general formula as set forth in claim 1 with a polyfunctional cross-linking agent selected from the group consisting of polycarboxylic acids and anhydrides.

13. A linear polymeric ester compound of 9(10)-chloro-10(9)-hydroxystearic acid, said compound having a terminal hydroxyalkyl substituent group and having the general formula as set forth in claim 1.

References Cited by the Examiner

UNITED STATES PATENTS

| | | | |
|---|---|---|---|
| 2,542,062 | 2/51 | Swern | 260—18 |
| 2,993,920 | 7/61 | Budde et al. | 260—18 |
| 3,001,921 | 9/61 | Pennino | 260—78.3 |
| 3,021,316 | 2/62 | Cox et al. | 260—78.3 |
| 3,051,687 | 8/62 | Young et al. | 260—78.3 |
| 3,112,325 | 11/63 | Murata et al. | 260—348 |

FOREIGN PATENTS

| | | |
|---|---|---|
| 863,446 | 3/61 | Great Britain. |

LEON J. BERCOVITZ, *Primary Examiner.*

N. D. TORCHIN, DONALD E. CZAJA, *Examiners.*